(12) United States Patent
Namikata

(10) Patent No.: US 7,518,751 B2
(45) Date of Patent: Apr. 14, 2009

(54) IMAGE PROCESSING SYSTEM AND CONTROL METHOD THEREFOR

(75) Inventor: Takeshi Namikata, Kanagawa (JP)

(73) Assignee: Canon Kabushiki Kiasha, Tokyo (JP)

( * ) Notice: Subject to any disclaimer, the term of this patent is extended or adjusted under 35 U.S.C. 154(b) by 929 days.

(21) Appl. No.: 10/648,316

(22) Filed: Aug. 27, 2003

(65) Prior Publication Data

US 2004/0090641 A1 May 13, 2004

(30) Foreign Application Priority Data

Aug. 29, 2002 (JP) .............................. 2002-251443

(51) Int. Cl.
*H04N 1/60* (2006.01)
*G06K 15/02* (2006.01)
(52) U.S. Cl. .......................... 358/1.9; 358/1.2; 358/518; 358/1.14
(58) Field of Classification Search .................. 358/1.9, 358/1.2, 1.15, 1.14, 1.1, 1.4, 1.6, 1.13, 1.18, 358/518, 437, 468, 407, 500, 501; 382/162, 382/167, 165, 209, 218, 217, 298, 299; 347/2, 347/3, 5, 14, 23, 24; 399/1, 8; 380/201, 380/203, 243, 55; 713/189, 182
See application file for complete search history.

(56) References Cited

U.S. PATENT DOCUMENTS 5,430,525 A 7/1995 Ohta ........................... 399/366

6,144,835 A * 11/2000 Inoue et al. .................. 399/366
6,493,462 B1 * 12/2002 Inoue .......................... 382/170
7,155,051 B2 * 12/2006 Murakawa ................... 382/135

FOREIGN PATENT DOCUMENTS

| EP | 1 043 883 A2 | 10/2000 |
|----|----|----|
| JP | 2000-253242 | 9/2000 |
| JP | 2000-293691 | 10/2000 |
| JP | 2000-307851 | 11/2000 |
| JP | 2001-243471 | 9/2001 |

* cited by examiner

*Primary Examiner*—Dov Popovici
(74) *Attorney, Agent, or Firm*—Fitzpatrick, Cella, Harper & Scinto

(57) ABSTRACT

An image processing system has a host computer to which a scanner and a printer are connected. A color space conversion module, for converting a color space of a device input-output image into a predetermined color space, likewise a resolution conversion module, for converting the resolution of the image into a predetermined resolution, and a counterfeit determination module, which determines a degree of a match between the image signal converted into predetermined color space and resolution and a particular image, are included in the OS of the host computer. The OS further includes an anti-counterfeiting module for preventing or suppressing counterfeiting based on the results of the matching determination. By providing the various modules in the OS instead of the device, the system is able to provide counterfeiting prevention and anti-counterfeiting capabilities designed to accommodate a plurality of different types of input-out devices efficiently.

13 Claims, 11 Drawing Sheets

FIG. 4
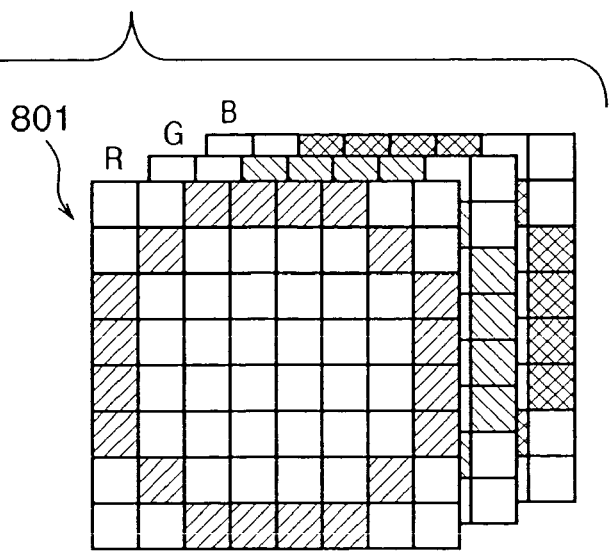
SCANNER A TEMPLATE
- RESOLUTION 400dpi
- SCANNER A RGB COLOR SPACE
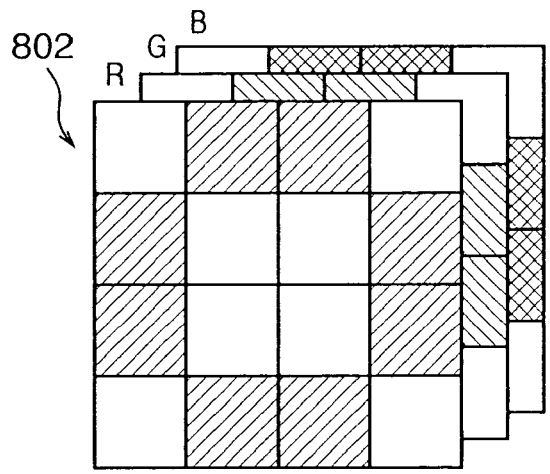
SCANNER B TEMPLATE
- RESOLUTION 200dpi
- SCANNER B RGB COLOR SPACE
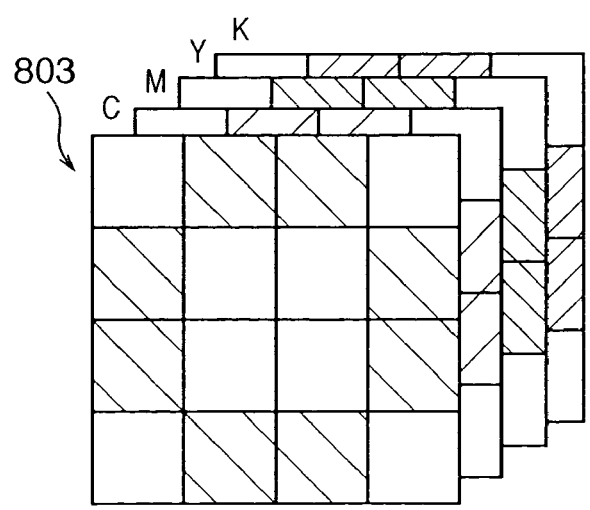
PRINTER A TEMPLATE
- RESOLUTION 200dpi
- PRINTER A CMYK COLOR SPACE

FIG. 9

WARNING : REPRODUCTION OF THIS IMAGE IS PROHIBITED BY LAW.

DO YOU REALLY WANT TO PROCESS THIS IMAGE?

YES  NO

FIG. 10

LOG INFORMATION

| | |
|---|---|
| TIME : | 1998/12/24 10:00 |
| HOST COMPUTER INFORMATION : | |
| · MAKER NAME | |
| · HOST IMAGE DATA | |
| · OS VERSION | |
| PIXEL SIZE : | 2500 × 800 |
| DETERMINATION RATE : | 95% |

IMAGE PROCESSING SYSTEM AND CONTROL METHOD THEREFOR

CLAIM OF PRIORITY

This application claims priority under 35 U.S.C. § 119 from Japanese Patent Application No. 2002-251443, entitled "An Image Processing System and a Control Method Thereof" and filed on Aug. 29, 2002, the entire contents of which are hereby incorporated by reference herein.

FIELD OF THE INVENTION

This invention relates to an image processing system and control method, and more particularly, to an image processing system and control method, for example, for preventing unauthorized reproduction of documents.

BACKGROUND OF THE INVENTION

In recent years, improvements in the performance of color printers and color image scanning devices (hereinafter referred to as color scanners) using CCDs and the like have brought about a heightened risk of unauthorized reproduction of documents, in other words counterfeiting, such as that of paper currency, negotiable securities and the like.

In order to prevent such counterfeiting, JPA 2000-307851 and JPA 2000-293691, for example, disclose a scanner driver and printer driver run by the operating software (OS), or a counterfeit prevention module run on the OS to prevent the scanning and output of an image ascertained to be one whose reproduction is prohibited.

However, a variety of types of color scanners and color printers are now available, each with its own unique resolution and color space.

As a result in the case of a color scanner or color printer provided with an anti-counterfeiting module as described above, processes for every device must be performed in the module. In other words, the scanner driver or printer driver must have anti-counterfeiting modules, each performing the same process, equal in number to the number of compatible scanners and printers, which puts pressure on the memory capacity.

SUMMARY OF THE INVENTION

Accordingly, the present invention is conceived in response to the above-described disadvantage of the conventional art, and provides an image processing system for efficiently performing anti-counterfeiting adapted to a plurality of different types of inputted image devices, and a control method therefor.

According to one aspect of the present invention, preferably, an image processing system having a host computer capable of communicatively connecting an image input-output device comprises:

a color space conversion unit for converting color space of an image which is an input-output target of the image input-output device into a predetermined color space;

a resolution conversion unit for converting resolution of the image which is the input-output target of the image input-output device into a predetermined resolution;

a determination unit for determining the extent of a match between a particular image and a signal of an image converted into said predetermined color space and predetermined resolution; and an image processing control unit for controlling processing of said image based on the extent of the match as determined by the determination unit, the color space conversion unit, the resolution conversion unit, the determination unit and the image processing control unit being run on the host computer operating software (OS).

According to another aspect of the present invention, preferably, the image processing control unit generates a warning if the extent of the match meets or exceeds a predetermined threshold value.

According to another and further aspect of the present invention, preferably, the image processing system further comprises:

a dialog box display unit for displaying a dialog box used for inputting instructions as to whether or not to continue with processing if the extent of the match meets or exceeds the predetermined threshold value;

a record archiving unit for archiving the operating record if an instruction is given to continue with processing in response to said dialog box; and a discontinuance unit for discarding the image if an instruction is given to discontinue with processing in response to said dialog box.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 4 is a diagram showing an example of a pattern matching template applied with each device when making a counterfeiting determination in an ordinary system;

FIG. 9 is a diagram showing a sample dialog box screen in response to input of an image whose reproduction is prohibited, according to the present embodiment;

FIG. 10 is a diagram showing a sample operation record in response to input of an image the reproduction of which is prohibited.

DETAILED DESCRIPTION OF THE PREFERRED EMBODIMENTS

Preferred embodiments of the present invention will be described in detail in accordance with the accompanying drawings.

In order to further an understanding of the present invention, a description is first given of the counterfeiting determination and prevention processes as they are performed in an ordinary scanner system and printer system.

(1) Ordinary Scanner System

The following is a simple description of a scanner system, which includes a host computer and which is widely used at present.

Figure 1:
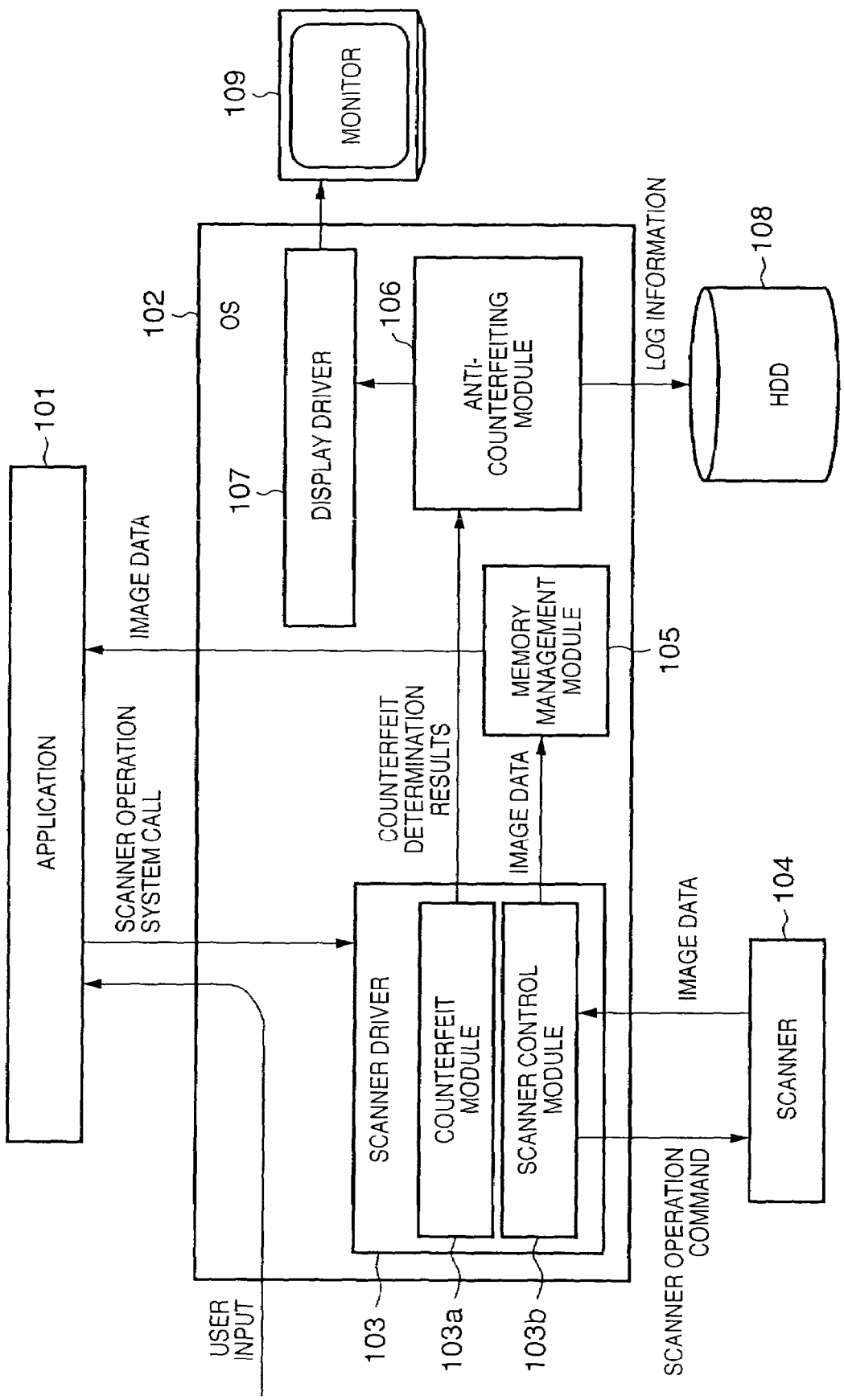
FIG. 1 is a block diagram showing an ordinary scanner system structure.

FIG. 1 is a block diagram showing an ordinary scanner system structure. Operating system (OS) 102 runs on a host computer and a scanner control application 101 runs on the OS, thus providing an operating environment for scanning and the like by a scanner 104.

The OS 102 may, like UNIX™, for example, have a split structure, in which a device driver that interfaces with the hardware and a module that manages the remaining user applications and the memory are installed separately. In addition to controlling user input and the other hardware devices, the OS 102 has a scanner driver 103 as a module that controls the scanner.

The scanner driver 103 has a scanner control module 103b that directly controls the scanner 104 and a counterfeit determination module 103a for determining whether or not an image scanned from the scanner 104 is an image whose reproduction is prohibited. Also, the OS 102 is provided with a memory management module 105 for managing the image data area secured in a RAM or the like not shown in the diagram.

In addition, the scanner control application 101 is composed of a GUI routine for interfacing with the user, a routine that interprets user input acquired via the OS 102 and issues scanner 104 operating commands, a routine that displays an image read in from the scanner 104 and a routine that saves the scanned image on a hard disk (hereinafter HDD).

The scanner 104 sweeps a CCD line sensor over a document placed on the document tray and electronically scans the document in accordance with scanner control signals from the scanner driver 103, and returns an image signal to the scanner driver 103 in accordance with a predetermined interface protocol. The image signal is divided into a plurality of color components such as R, G, B, etc., each of which consists of 8-12 bits of data.

A description is now given of the counterfeiting prevention process of the scanner system shown in FIG. 1.

Figure 2:
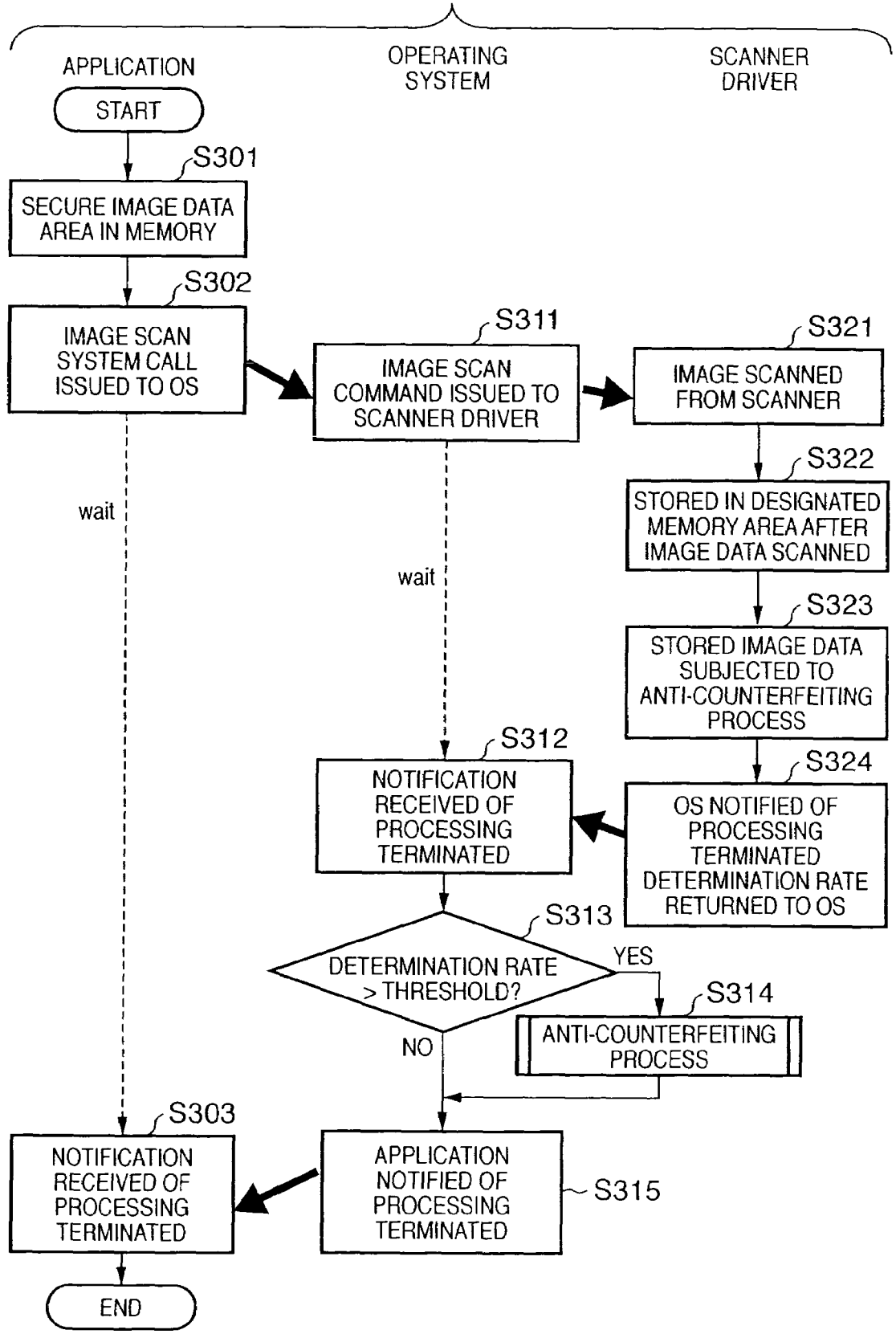
FIG. 2 is a flow chart showing anti-counterfeiting processing in an ordinary scanner system.

FIG. 2 is a flow chart showing steps in a counterfeiting prevention process of a scanner system, as executed at every module in the application 101, OS 102 and scanner driver 103.

When a user, via the scanner control application 101, issues a command to commence scanner operation, scanning of the image by the scanner 104 begins. At this time, the application 101, in a step S301, first secures space on a RAM (not shown in the diagram) for a designated target image to be scanned, and in a step S302 then issues a specific image scan command to the OS 102 for the scanner 104. Next, in a step S303, the application enters a standby mode until it receives notification from the OS 102 that image scanning is completed.

When the OS 102 receives an image scan command from the application 101, the OS 102 first, in a step S311, issues a command to the scanner driver 103 to load a scanner control module 103b for the specified scanner 104 and scan an image via the scanner 104. The OS 102 then enters a standby mode until the scanner driver 103 completes processing. It should be noted that, at this time, on the OS 102 side, the anti-counterfeiting module 106 is activated and calculates the determination rate that expresses whether or not the image data likely represents an image whose reproduction is prohibited.

The scanner driver 103, upon receiving an image scan command from the OS 102, in a step S321 issues to the scanner 104 corresponding to the scanner control module 103b a scan commence command unique to that scanner, whereby image scanning by the scanner 104 is commenced.

Then, in a step S322, after the image has been scanned, an image signal received from the scanner 104 is stored in the image data space reserved in the RAM by the application 101, and the process proceeds to the counterfeit determination module 103a.

The counterfeit determination module 103a, which is provided with one or more reproduction-prohibited patterns as a template or templates separate from that used to stored image data in the memory (either the RAM or the ROM), in a step S323 matches the pattern of the stored image data against the patterns of the templates and outputs a value between 0 and 100 as the determination rate. As a concrete example of this type of pattern matching, there is the example of taking the interrelationship between each color component of the image data and the templates and outputting a maximum value. In order to accommodate a plurality of reproduction-prohibited patterns, it is sufficient to match the pattern of the image data against a plurality of pre-stored templates and output the maximum value.

When image data is scanned in and the scanner driver 103 completes the counterfeit determination process, the scanner driver 103 notifies the OS 102 that processing is completed and at the same time returns a pattern matching determination rate from the counterfeit determination module 103a.

Then, in a step S312, when the OS 102 receives notification from the scanner driver 103 that processing is complete, in a step S313 a determination is made as to whether or not the image data is an image whose reproduction is prohibited. For example, if the determination rate is greater than the threshold value previously set in the OS 102, then the system determines that there is a strong possibility that that image data is an image whose reproduction is prohibited, at which point the process then proceeds to the anti-counterfeiting process of step S314. This anti-counterfeiting process may, for example, involve notifying the user that the scanned image is an image whose reproduction is prohibited and halting the accumulation of such image so as to prevent counterfeiting (in a step S314), with the OS 102 indicating to the application 101 that processing is terminated in a step S315. By so doing, the image scanning operation of the scanner system is terminated.

Thus, as described above, in an ordinary scanner system, the scanner driver 103 and the OS 102 prevent counterfeiting of the input image from the scanner 104.

(2) Ordinary Printer System

A description is now given of printer system that includes a host computer and which is currently widely used.

Figure 3:
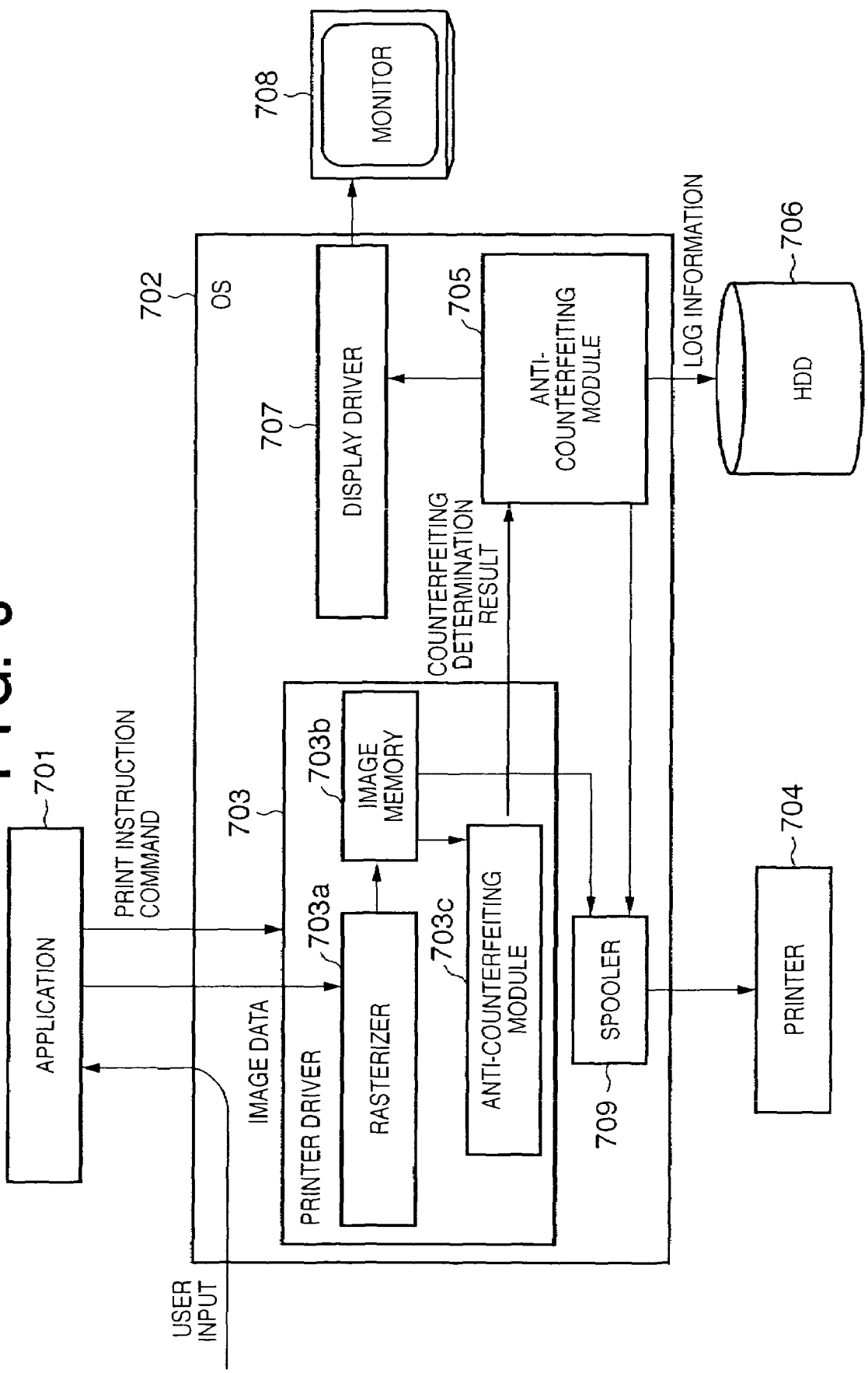
FIG. 3 is a block diagram showing the structure of an ordinary printer system.

FIG. 3 is a block diagram showing the structure of such an ordinary printer system. OS 702 runs on the host computer and an application 701 runs on the OS 702, such that an operating environment (including image output, etc.) is provided to a printer 704.

In addition to controlling user input and other hardware devices, the OS 702 has a printer driver 703 as a module that controls the printer 704. The printer driver 703 in turn has a rasterizer 703a that generates image data suitable for the printer 704, an image memory 703b that stores the image data so generated, and a counterfeit determination module 703a for determining whether or not a rasterized image is an image whose reproduction is prohibited. The counterfeit determination results that are the output of the counterfeit determination module 703a are sent to an anti-counterfeiting module 705, which acts to either prevent or restrict counterfeiting depending on the counterfeit determination results. The OS 702 has a print spooler 709 that controls output of the rasterized image to the printer 704.

A description is now given of the counterfeiting prevention process of the printer system shown in FIG. 3.

It should be noted that this process is similar to the counterfeiting prevention process of the scanner system described above, so the description given here is a simplified one.

When a print instruction command is received from the application 701, the OS 702 requests that the printer driver 703 print the data received from the application 703.

When the printer driver 703 receives the print request, the rasterizer 703a renders the print document as image data and stores it in the image memory 703b. The stored image is then sent to the counterfeit determination module 703c and the print spooler 709, where counterfeit determination and printing, respectively, are commenced.

Counterfeit determination module 703c matches the pattern of the image to be printed against a predetermined template pattern in order to determine whether or not the image to be printed is an image whose reproduction is prohibited, and sends the determination rate so obtained to the anti-counterfeiting module 705.

The anti-counterfeiting module 705 compares the determination rate that is the output of the counterfeit determination process module with a threshold value previously set in the OS 702. If the determination rate is greater than the threshold value, the system displays a predetermined warning dialog box on a monitor 708. If in response to the dialog box the user indicates that printing of the image is not to be performed, the system issues a spool stop command to the print spooler 709 and printing is terminated.

As described above, in an ordinary printer system, the printer driver 703 and the OS2 carry out counterfeiting prevention of the image output to the printer 704.

(3) The Image Processing System of the Present Embodiment

In the above-described ordinary scanner system and printer system, the scanner driver 103 and printer driver 703, respectively, are used to prevent counterfeiting. The scanner 104 and printer 704 of these systems have unique color spaces and resolutions for each device, and the pattern matching at each of the counterfeiting determination modules 103a and 703c is carried out by comparing resolutions and color components in device-specific color spaces with reference templates.

FIG. 4 is a diagram showing an example of a pattern matching template applied with each device when making a counterfeiting determination in an ordinary system. In FIG. 4, templates 801, 802 and 803 are templates used for a scanner A, a scanner B and a printer A, respectively, in an instance in which the determination target is a circular pattern of a particular density.

In the pattern matching by a counterfeit determination module in a system like that described above, in order to accomplish pattern matching by taking the interrelation between the image data and each of the color components and outputting a maximum value, the templates have patterns for each color component. In FIG. 4, the resolution of template 801 is 400 dpi, and the resolution of templates 802 and 803 is 200 dpi. Moreover, whereas templates 801 and 802 are for use with an RGB color space, template 803 is for use with a CMYK color space; since their respective color spaces differ the templates also have different numbers of planes. Thus, the templates have different resolutions and are used for different color spaces.

Here, particularly with regard to color space, the difference between RGB and CMYK basically is that the RGB value output by scanner A is a value for a color space determined by the CCD characteristics of scanner A, and the RGB value output by scanner B is a value for a different color space determined by CCD characteristics that are different from the CCD characteristics of scanner A. Similarly, with respect to the printer CMYK color space, different colors may be output with the same CMYK color value depending on the output target printer.

So, in the present embodiment, a counterfeiting prevention module is installed not on every driver but in the OS instead, and moreover, a color space conversion module and a resolution conversion module are provided in the OS as well in order to ensure that the image color space and resolution to be input to the OS counterfeiting prevention module is of one type only. In other words, in the present embodiment, no matter what the image input from the scanner or printer, by using the color space conversion module and the resolution conversion module installed on the OS side to convert that output into a common color space expression and resolution expression, the need to accommodate every scanner driver and printer driver is eliminated.

(4) System Structure

The distinctive feature of the present embodiment is that the counterfeiting prevention process is carried out at the OS in an image processing system composed of a host computer, scanner and printer.

Figure 5:
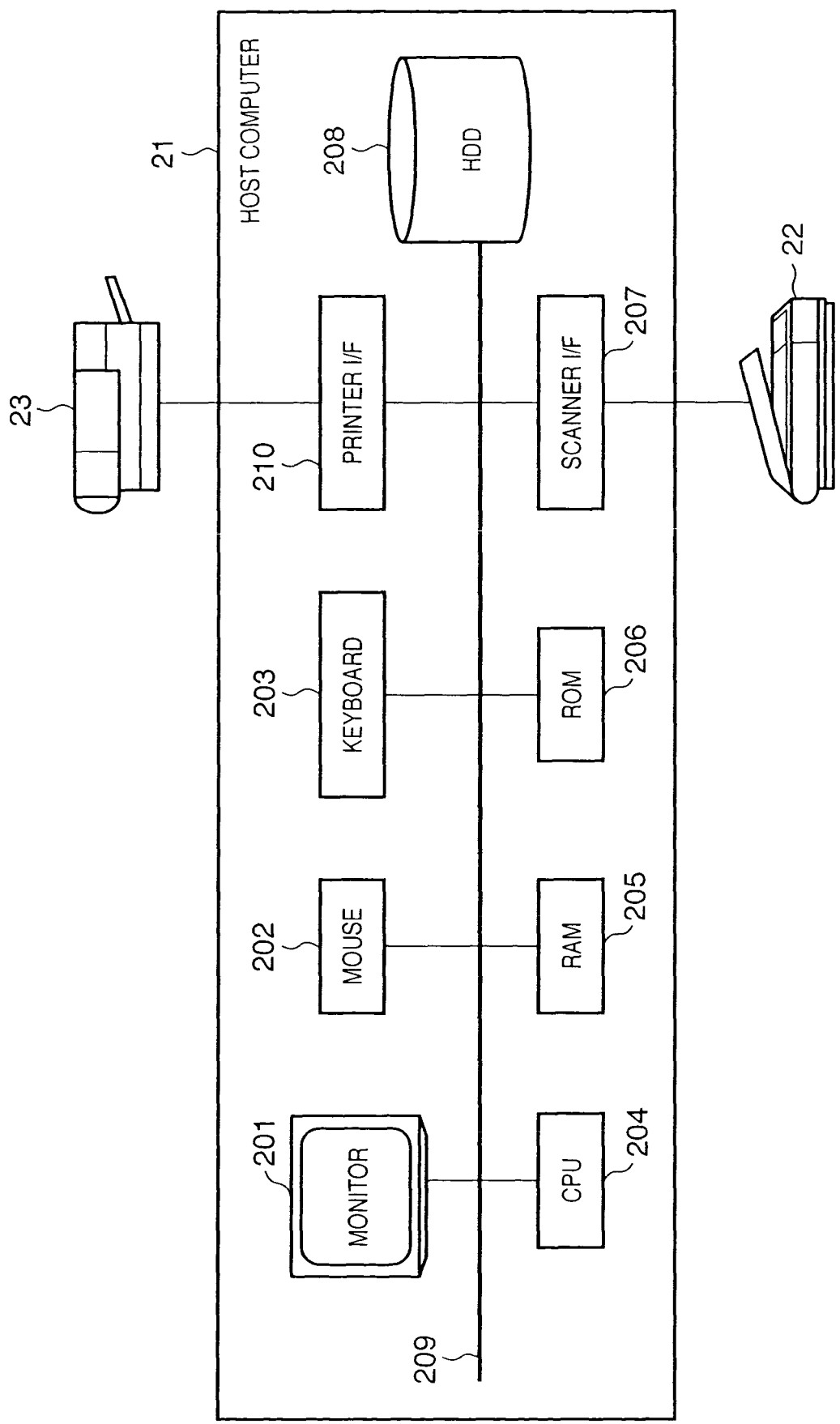
FIG. 5 is a block diagram showing an example of the structure of an image processing system according to one embodiment of the present invention.

FIG. 5 is a block diagram showing an example of the structure of an image processing system according to one embodiment of the present invention. As shown in the diagram, the image processing system of the present embodiment comprises a host computer 21, a scanner 22 and a printer 23. Further, the host computer 21 includes a monitor 201 displaying image scanning results from a GUI and scanner, a mouse 202 for transmitting user input to the application and the OS, a keyboard 203, a HDD 208 for storing various programs and image data, a ROM 206 for storing host computer basic programs, a RAM 205 for storing program scans and images, and a printer I/F for controlling the printer 23, all of which are interconnected via an internal bus 209 and controlled by a CPU 204.

On the host computer 22 configured as described above, the CPU 204 runs programs read into the RAM 205 from the HDD 208, by which the OS and applications of the present embodiment are implemented.

Figure 6:
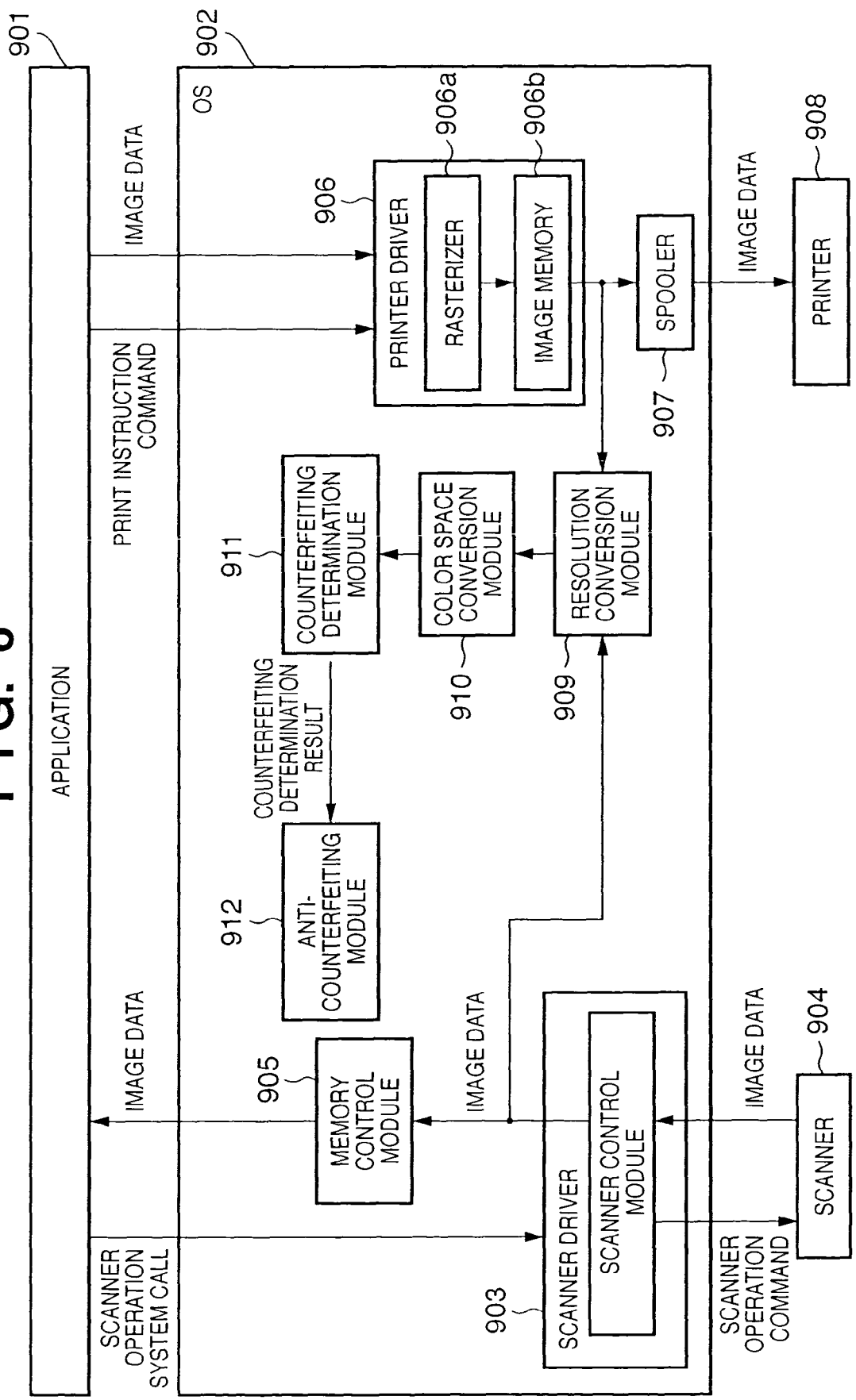
FIG. 6 is a block diagram showing the module structure of an image processing system according to the present embodiment.

FIG. 6 is a block diagram showing the module structure of an image processing system according to the present embodiment. When an OS 902 starts running on a host computer 22 and an application 901 starts running on the OS, an operating environment is provided which includes image output to a scanner 904 and a printer 908.

The OS 902 includes a scanner driver 903 that, in addition to controlling user input and other hardware devices, functions as a module for controlling the scanner 904. The OS 902 also includes a printer driver 906 that functions as a module that controls the printer 908.

The scanner driver 903 includes a scanner control module that directly controls the scanner 904, so that an image read from the scanner 904 is taken in by a memory management module 905 for managing an image data area of the OS 902.

The printer driver 906 includes a rasterizer 906a that generates image data suitable for the printer 908 and an image memory 906b for storing the generated image data. In addition, the OS 902 also includes a print spooler for controlling output of the rasterized image to the printer 908.

Moreover, the OS 902 also includes a color space conversion module 909, which takes an image output from the printer driver 906 and performs a color space conversion thereon, and a resolution conversion module 910, which performs resolution conversion. Images that have been color space converted and resolution converted by these modules are then input to a counterfeit determination module 911 and a determination rate is calculated as a counterfeit determination rate using the pattern matching technique described above.

The counterfeit determination results output from the counterfeit determination module 911 are sent to the anti-counterfeiting module 912. Based on the determination results, the anti-counterfeiting module 912 then either prevents or suppresses counterfeiting.

(5) Counterfeiting Prevention Process

Figure 7:
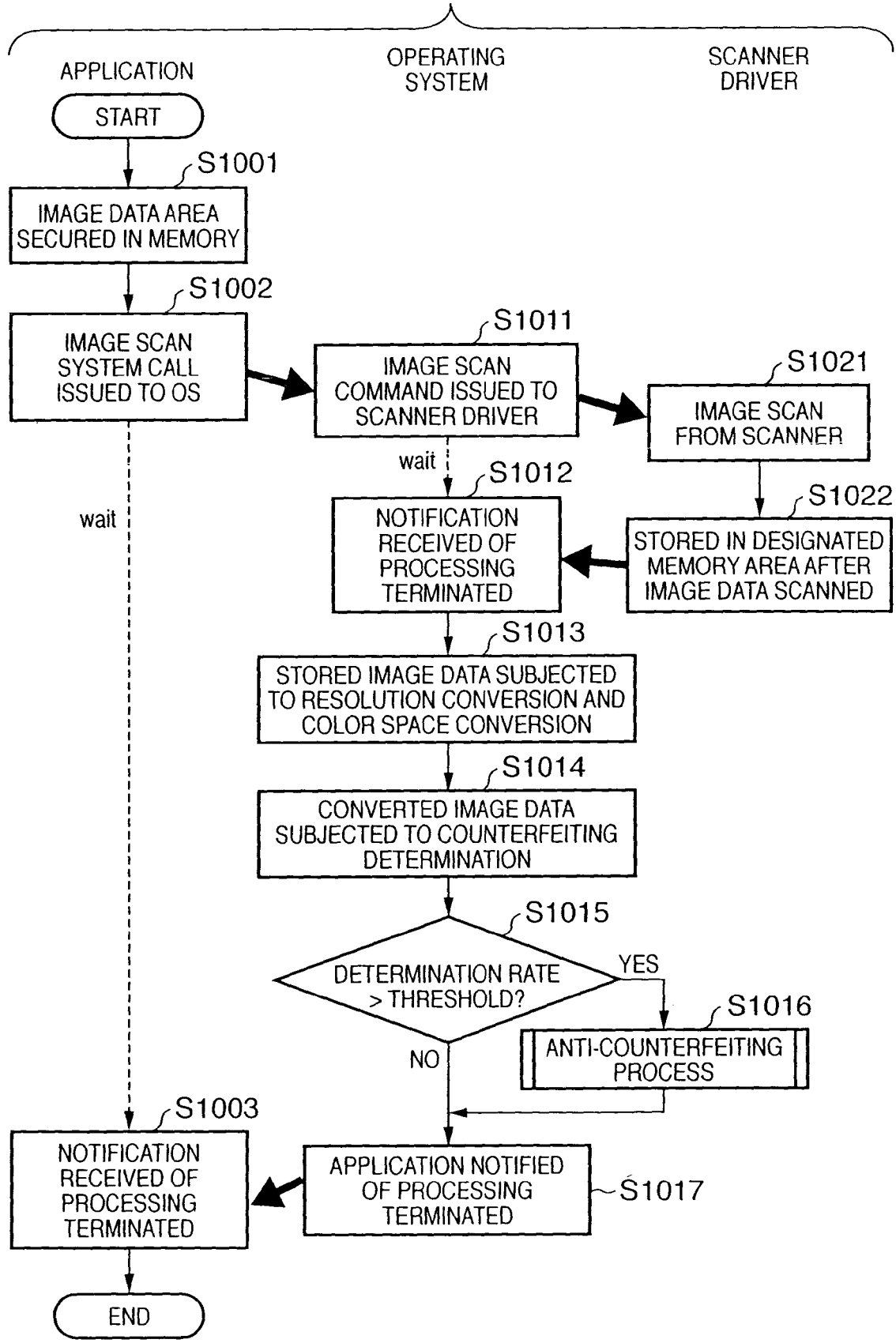
FIG. 7 is a flow chart showing counterfeiting prevention processing in the present embodiment.

A description is now given of the counterfeiting prevention process of the present embodiment, with reference to FIG. 7.

FIG. 7 is a flow chart showing counterfeiting prevention processing in the present embodiment, in which the steps in that process are shown as executed by each of the application 901, the OS 902 and the scanner driver 903.

When the user issues a command via the application 901 to begin scanning, image scanning by the scanner 904 commences. In a step S1001, the application 901 secures space on the RAM 205 for a designated image to be scanned. Next, in a step S1002, the application 901 issues a command to the OS 902 to have the scanner 904 scan the designated image. In a step S1003, the application enters a standby state until it receives notification from the OS 902 that scanning of the image is completed.

The OS 902, when it receives an image scan command from the application 901, issues a command to the scanner driver 903 to load the scanner control module corresponding to the designated scanner 904 and read the image from the scanner 904. Thereafter the OS 902 goes into standby mode until the scanner driver 903 processing is completed.

Upon receiving an image scan command from the OS 902, the scanner driver 903 issues a command to the scanner 104 that is unique to that scanner to commence scanning in a step S1021, after which scanning of the image by the scanner 104 begins. In a step S1022, after the image has been scanned, the image signal received from the scanner 904 is stored in the image data area secured by the application 901 and the OS 902 notified that processing is completed.

In a step S1012, the OS 902 receives notification from the scanner driver 903 that processing is completed. In a step S1013, the OS 902 performs color space conversion and resolution conversion on the image stored in the RAM 205 by the scanner driver 903 using the color space conversion module and the resolution conversion module. For the resolution conversion, a commonly known linear interpolation or spline interpolation technique may be used. A similar discussion of the color space conversion process is reserved for later.

When the conversion processes of step S1013 are completed, the converted image is subjected to a counterfeiting determination in a step S1014. The counterfeit determination process employed here is the same as that used in any ordinary scanner system or printer system as described above, with results output in the form of a determination rate using pattern matching.

In a step S1015, it is determined whether the determination rate output as a counterfeit determination rate is greater than a predetermined threshold value or not, and, if greater, the system concludes that there is a strong possibility that the image data in question is an image whose reproduction is prohibited, as a result of which the process moves to anti-counterfeiting in a step S1016. A detailed description of the anti-counterfeiting process is reserved for later.

Thereafter, in a step S1017, the OS 902 indicates to the application 901 that processing is completed, thus finishing scanning in the present embodiment.

It should be noted that although in the foregoing embodiment the anti-counterfeiting process is described as it is when used as a scanner system, the anti-counterfeiting process is carried out in the same way when used as a printer system. In other words, at the same time as images accumulate in the spooler 907 from the printer driver 703 906, the OS 902, which is monitoring that image accumulation in the spooler 907, carries out color space conversion and resolution conversion, after which the counterfeiting prevention process is carried out on the OS 902 side.

(6) Anti-Counterfeiting Processing

A description is now given of the anti-counterfeiting processing of the present embodiment, with reference to FIGS. 8, 9, 10 and 11.

Figure 8:
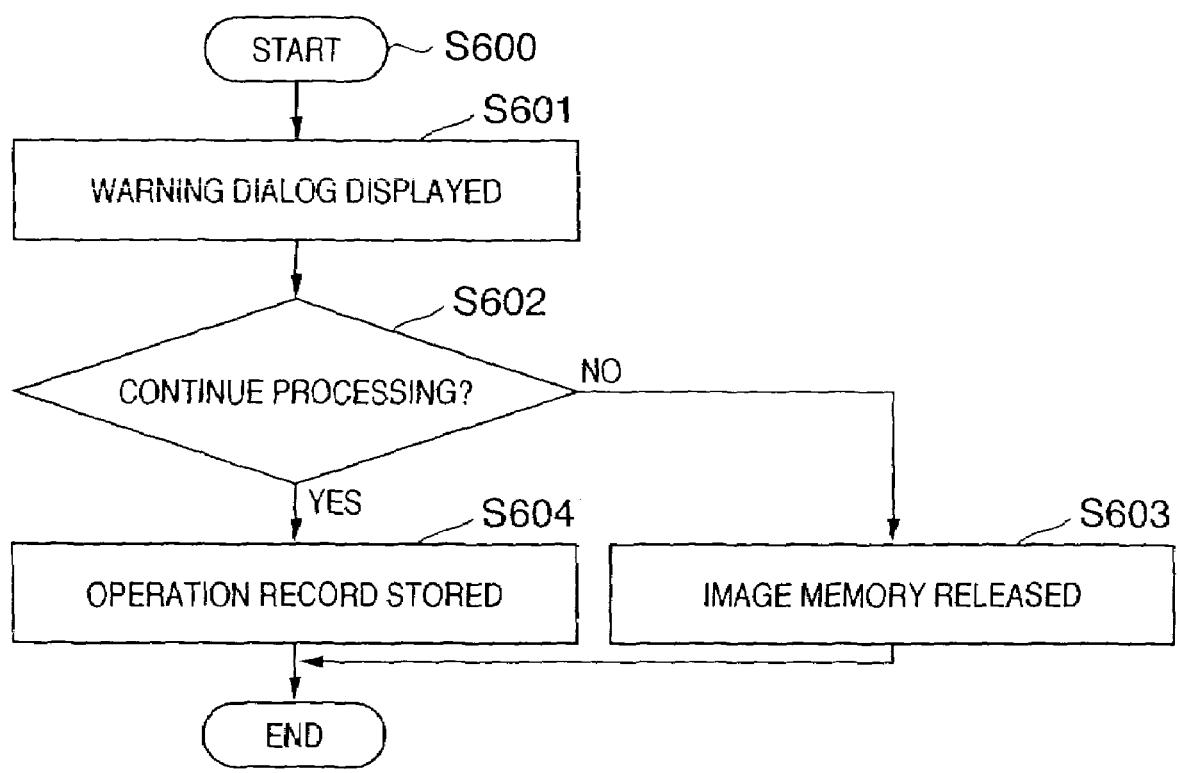
FIG. 8 is a flow chart showing anti-counterfeiting processing in the present embodiment.
Figure 11:
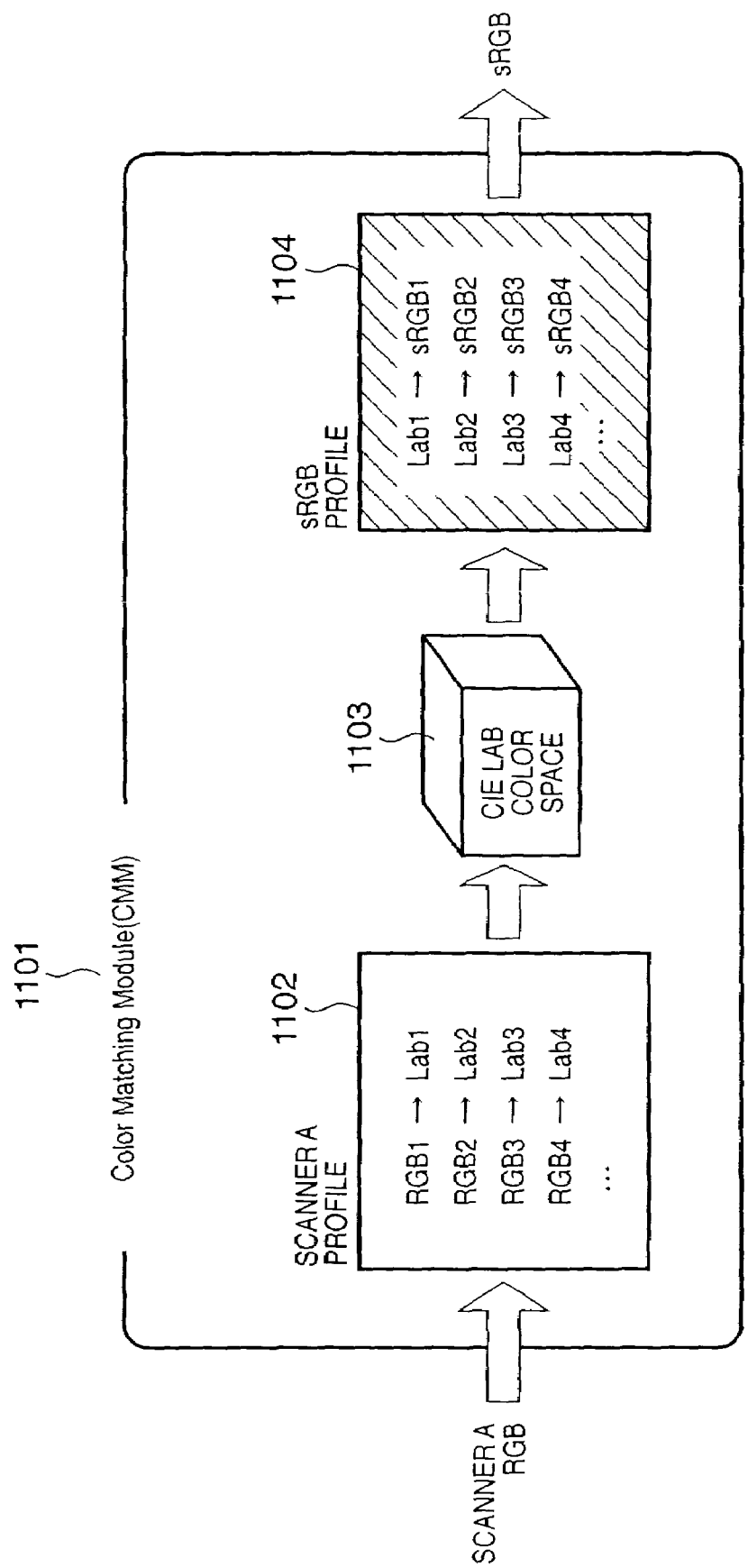
FIG. 11 is a schematic diagram showing color space conversion according to the present embodiment.

FIG. 8 is a flow chart showing anti-counterfeiting processing in the present embodiment, showing the steps in the anti-counterfeiting process of step S1016. FIG. 9 is a diagram showing a sample dialog box screen in response to input of an image whose reproduction is prohibited, according to the present embodiment. FIG. 10 is a diagram showing a sample operation record in response to input of an image the reproduction of which is prohibited. FIG. 11 is a schematic diagram showing color space conversion according to the present embodiment.

When the anti-counterfeiting process is commenced in a step S600, a display driver not shown in the diagram in a step S601 displays a user input menu like that shown in FIG. 9 on the monitor 201. That is, when there is a strong possibility that the image input from the scanner 904, or that the image output to the printer 908, is an image whose reproduction is prohibited, the system queries the user as to whether or not to continue with the current process. In a step S602, if the user input indicates that the process is to be continued (that is, the "Yes" button in the menu shown in FIG. 9), then in a step S604 an operation record like that shown in FIG. 10 is archived to the HDD 208. By so doing, a record remains of the scanning and/or printing of the image whose reproduction is prohibited.

On the other hand, if the user input indicates that the current process is to be discontinued (that is, the "No" button in the menu shown in FIG. 9), then in a step S603 either the memory area in which the image is stored is released and the scan is canceled or a spool stop command is issued to the printer spooler and printing is terminated.

(7) Color Space Conversion

In the color matching module 1101, color space dependent on each individual device is converted into sRGB color space which can be used by the typical OS, such as that shown in FIG. 11.

Specifically, an image input as a color space signal of scanner A is first converted to a CIE LAB color space 1103 by a scanner A profile 1102 correlating device-dependent color space for scanner A with device-independent color space. Next, from the CIE LAB color space, the image is converted to sRGB color space by the sRGB profile 1104 correlating CIE LAB color space and sRGB color space. It should be noted that these conversions are carried out by interpolative calculations using look-up tables in the profiles.

Color matching using ICC profile is known as one type of color space conversion process described above, and a module that performs color matching is typically included in the OS. For example, there is ICM for Microsoft Corp.'s Windows? OS and ColorSync for MacIntosh OS. Therefore, when applying the present invention to ordinary OS, color space conversion can be carried out using the existing color matching module.

In the preceding description, the object to be subjected to counterfeiting determination is a visible pattern in the target document. However, as can be appreciated by those of ordinary skill in the art, the present invention can also be adapted to examination of invisible patterns such as electronic watermarks and the like embedded in the target document. It should be noted that color-based determinations are not necessary in the case of invisible marks. In such cases only resolution conversion is performed and the document is processed for electronic watermark detection prior to performing any color space conversion. As a result of this arrangement, it becomes possible to extract with a high degree of accuracy electronic watermarks because the image data does not include color space conversion-generated calculation error.

According to the present embodiment as described above, images input to the counterfeiting prevention module of the OS from a plurality of different types of scanners or images output to a plurality of different types of printers are input with a unified color space and resolution. Therefore, counterfeiting prevention for images input from a variety of scanners or output to a variety of printers can be carried out efficiently using a single anti-counterfeiting module.

It should be noted that in the present embodiment the counterfeit determination module 911 is a software module. However, it is also possible to use a hardware module instead, thereby increasing processing speed.

According to the present embodiment as described above, it is possible to provide counterfeiting capabilities efficiently to a plurality of different types of image input-output devices.

It should be noted that a software program for implementing the capabilities of the above-described embodiments (that is, a program corresponding to one or more of the flow charts shown in FIGS. 7 or 8), supplied either directly from a recording medium or by using wire or wireless communications, to a system or apparatus having a computer capable of executing such program, the execution of such program by the computer of the system or apparatus achieving equivalent capabilities of the above-described embodiments, is within the purview of the present invention.

Accordingly, a program supplied to and installed in such a computer for the purpose of implementing the functional processes of the present invention itself achieves the present invention. That is, a computer program for implementing the processes performed by the present invention is itself within the purview of the present invention.

The recording media for supplying the program include, but are not limited to, magnetic recording media such as a floppy disk, a hard disk or magnetic tape, optical or magneto-optical recording media such as MO, CD-ROM, CD-R, CD-RW, DVD-ROM, DVD-R or DVD-RW, or a non-volatile semiconductor memory.

In addition, as can be appreciated by those of ordinary skill in the art, in addition to implementing the capabilities of the above-described embodiments by reading out and executing the above-described program by computer, the above-described capabilities of the embodiments described above can also be implemented by OS running on a computer and performing some or all of the actual processes described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

The present invention is not limited to the above embodiments, and various changes and modifications can be made within the spirit and scope of the present invention. Therefore, to apprise the public of the scope of the present invention, the following claims are made.

What is claimed is:

1. An image processing apparatus capable of communicatively connecting to an image input-output device, the image processing apparatus comprising:

a color space conversion unit for converting a color space, which is dependent on the image input-output device, of an image which is output from a device driver of the image input-output device into a common color space used in an OS of a host computer, by performing color matching processing using a profile corresponding to the image input-output device, where the color matching processing is performed using a color matching module included in the OS;

a resolution conversion unit for converting a resolution of the image which is output from the device driver of the image input-output device into a common resolution;

a determination unit for determining the extent of a match between a particular image and an image converted into said common color space and said common resolution; and an image processing control unit for controlling processing of said image output from the device driver based on the extent of the match as determined by the determination unit, wherein the color space conversion unit, the resolution conversion unit, the determination unit and the image processing control unit are running on the OS, and the color space conversion unit, the resolution conversion unit, the determination unit and the image processing control unit are constructed independently of the device driver of the image input-output device.

2. The image processing apparatus according to claim 1, wherein the image processing control unit generates a warning if the extent of the match meets or exceeds a predetermined threshold value.

3. The image processing apparatus according to claim 2, further comprising:

a dialog box display unit for displaying a dialog box used for inputting instructions as to whether or not to continue with processing if the extent of the match meets or exceeds the predetermined threshold value;

a record archiving unit for archiving an operating record if an instruction is given to continue with processing in response to said dialog box; and a discontinuance unit for discarding the image if an instruction is given to discontinue with processing in response to said dialog box.

4. The image processing apparatus according to claim 1, wherein the particular image is a Currently Amended image whose reproduction is prohibited.

5. The image processing apparatus according to claim 1, further comprising: a driver for the image input-output device that runs on the host computer's software.

6. The image processing apparatus according to claim 1, wherein said image input-output device is either a scanner that scans an original image or a printer that outputs an image onto a recording medium.

7. An image processing method, the image processing method comprising:
- a color space conversion step for converting a color space, which is dependent on an image input-output device, of an image which is output from a device driver of the image input-output device into a common color space used in an OS of a host computer, by performing color matching processing using a profile corresponding to the image input-output device, where the color matching processing is performed using a color matching module included in the OS;
- a resolution conversion step for converting a resolution of the image which is output from the device driver of the image input-output device into a common resolution;
- a determination step for determining the extent of a match between a particular image and an image converted into said common color space and said common resolution; and
- an image processing control step for controlling processing of said image output from the device driver based on the extent of the match as determined in the determination step,
- wherein the color space conversion step, the resolution conversion step, the determination step and the image processing control step are executed by the OS, and the color space conversion step, the resolution conversion step, the determination step and the image processing control step are executed independently of the device driver of the image input-output device.

8. The image processing method according to claim 7, wherein a warning is generated at the image processing control step if the extent of the match meets or exceeds a predetermined threshold value.

9. The image processing method according to claim 8, further comprising:
- a dialog box display unit for displaying a dialog box used for inputting instructions as to whether or not to continue with processing if the extent of the match meets or exceeds the predetermined threshold value;
- a record archiving unit for archiving an operating record if an instruction is given to continue with processing in response to said dialog box; and
- a discontinuance unit for discarding the image if an instruction is given to discontinue with processing in response to said dialog box.

10. A computer-executable software control program stored on a computer-readable medium for causing a computer to perform a method comprising:
- a color space conversion step for converting a color space, which is dependent on an image input-output device, of an image which is output from a device driver of the image input-output device into a common color space used in an OS of a host computer, by performing color matching processing using a profile corresponding to the image input-output device, where the color matching processing is performed using a color matching module included in the OS;
- a resolution conversion step for converting a resolution of the image which is output from the device driver of the image input-output device into a common resolution;
- a determination step for determining the extent of a match between a particular image and an image converted into said common color space and said common resolution; and
- an image processing control step for controlling processing of said image output from the device driver based on the extent of the match as determined in the determination step,
- wherein the color space conversion step, the resolution conversion step, the determination step and the image processing control step are running on the OS, and the color space conversion step, the resolution conversion step, the determination step and the image processing control step are executed independently of the device driver of the image input-output device.

11. The control program stored on a computer-readable medium according to claim 10, wherein, a warning is generated at the determination step if the extent of the match meets or exceeds a predetermined threshold value.

12. The control program stored on a computer-readable medium according to claim 11, wherein the determination step further comprises:
- a dialog box display step of displaying a dialog box used for inputting instructions as to whether or not to continue with processing if the extent of the match meets or exceeds the predetermined threshold value;
- a record archiving step of archiving an operating record if an instruction is given to continue with processing in response to said dialog box; and
- a discontinuance step of discarding the image if an instruction is given to discontinue with processing in response to said dialog box.

13. A computer-readable medium having a computer-executable software control program stored thereon, the control program causing a computer to perform a method comprising:
- a color space conversion step for converting a color space, which is dependent on an image input-output device, of an image which is output from a device driver of the image input-output device into a common color space used in an OS of a host computer, by performing color matching processing using a profile corresponding to the image input-output device, where the color matching processing is performed using a color matching module included in the OS;
- a resolution conversion step for converting a resolution of the image which is output from the device driver of the image input-output device into a common resolution;
- a determination step for determining the extent of a match between a particular image and an image converted into said common color space and said common resolution; and
- an image processing control step for controlling processing of said image output from the device driver based on the extent of the match as determined in the determination step,
- wherein the color space conversion step, the resolution conversion step, the determination step and the image processing control step are running on the OS, and the color space conversion step, the resolution conversion step, the determination step and the image processing control step are executed independently of the device driver of the image input-output device.

* * * * *